US011475457B2

(12) United States Patent
Willis et al.

(10) Patent No.: US 11,475,457 B2
(45) Date of Patent: *Oct. 18, 2022

(54) INFORMATION SECURITY USING VELOCITY ATTACK DETECTION

(71) Applicant: BANK OF AMERICA CORPORATION, Charlotte, NC (US)

(72) Inventors: Therese H. Willis, Apopka, FL (US); James J. Park, Barrington, IL (US); Paul Marziani, Augustine, FL (US); Jeetendra H. Jain, Charlotte, NC (US); Eric W. Doyle, Smithton, IL (US); Vikash Damani, Harrisburg, NC (US); Chinmay S. Barhale, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 431 days.

This patent is subject to a terminal disclaimer.

(21) Appl. No.: 16/865,829

(22) Filed: May 4, 2020

(65) Prior Publication Data

US 2020/0265432 A1    Aug. 20, 2020

Related U.S. Application Data

(63) Continuation of application No. 15/595,490, filed on May 15, 2017, now Pat. No. 10,657,534.

(51) Int. Cl.
*G06Q 20/40* (2012.01)
*G06F 21/55* (2013.01)
(Continued)

(52) U.S. Cl.
CPC ......... *G06Q 20/407* (2013.01); *G06F 21/554* (2013.01); *G07F 7/082* (2013.01);
(Continued)

(58) Field of Classification Search
CPC ... G06Q 20/407; G06Q 20/40; H04W 12/126; H04W 12/12; G06F 21/554; G06F 21/55;
(Continued)

(56) References Cited

U.S. PATENT DOCUMENTS 6,243,718 B1 * 6/2001 Klein .................. G06F 16/2228
707/999.203
7,233,920 B1 * 6/2007 Rodriguez, Jr. ..... G06Q 40/025
705/64

(Continued)

*Primary Examiner* — Theodore C Parsons
*Assistant Examiner* — Howard H. Louie

(57) ABSTRACT

A data attack detection system that includes a record host and an orchestration host. The record host stores account information for card holders. The orchestration host includes a switch interface configured to receive transaction information for a card from a network. The orchestration host further includes a velocity trap engine that stores received transaction information for the card in a cardholder file. The velocity trap engine creates entries in a velocity transaction timestamp record for the card when the number of transactions for the card in the cardholder record within a first predetermined time interval exceeds a first activity level threshold. The velocity trap engine discontinues a transaction flow between the orchestration host and the record host for the card when the number of transactions for the card in the velocity transaction timestamp record within a second predetermined time interval exceeds a second activity level threshold.

17 Claims, 4 Drawing Sheets

(51) Int. Cl.
*H04W 12/12* (2021.01)
*H04W 12/126* (2021.01)
*H04L 9/40* (2022.01)
*G07F 7/08* (2006.01)

(52) U.S. Cl.
CPC ...... *H04L 63/1416* (2013.01); *H04L 63/1466* (2013.01); *H04W 12/12* (2013.01); *H04W 12/126* (2021.01)

(58) Field of Classification Search
CPC .. G07F 7/082; H04L 63/1416; H04L 63/1466
See application file for complete search history.

(56) References Cited

U.S. PATENT DOCUMENTS

| | | | |
|---|---|---|---|
| 7,630,924 | B1 | 12/2009 | Collins et al. |
| 8,165,945 | B2 * | 4/2012 | Collins .................. G06Q 40/12 |
| | | | 705/50 |
| 2007/0079071 | A1 * | 4/2007 | Saha ........................ G06F 5/14 |
| | | | 711/118 |
| 2013/0024359 | A1 | 1/2013 | Wright |
| 2013/0212006 | A1 * | 8/2013 | Siddens ............... G06Q 20/381 |
| | | | 705/39 |
| 2015/0073981 | A1 | 3/2015 | Adjaoute |
| 2015/0339673 | A1 | 11/2015 | Adjaoute |
| 2016/0005029 | A1 | 1/2016 | Ivey et al. |
| 2016/0328715 | A1 | 11/2016 | Gideon et al. |

\* cited by examiner

INFORMATION SECURITY USING VELOCITY ATTACK DETECTION

CROSS-REFERENCE TO RELATED APPLICATIONS

This application is a continuation of U.S. patent application Ser. No. 15/595,490 filed May 15, 2017, by Therese H. Willis et al., and entitled "Information Security Using Velocity Attack Detection," which is incorporated herein by reference.

TECHNICAL FIELD

The present disclosure relates generally to information security, and more specifically to detecting data attacks.

BACKGROUND

One type of data attack involves using computer BOTs to perform high-speed attacks for short bursts of time. These computer BOTs employ a software application that runs automated tasks or scripts over the Internet in an attempt to subvert a high speed fraudulent event. Unlike a denial-of-service (DOS) or a distributed DOS (DDOS) which attempts to maliciously degrade a computer system's performance, a fraud BOT intends on capturing customers' sensitive information (e.g. banking credentials) or stealing financial assets through automated high volume, rapid trial and error transaction messages. These velocity data attacks are performed at an unnatural rate and would be impossible for a human to perform manually.

Conventional systems perform front-door edits for other downstream applications to handle these types of attacks. However, downstream systems may experience undesired message handling that should be prevented earlier in the flow. An attack that includes multiple velocity data attacks at the same time may result in system failures if the system becomes overloaded for extended periods of time. Thus, it is desirable to detect and mitigate the effects of velocity data attacks.

SUMMARY

A velocity data attack is an automatically repeating attack or event that occurs at a rate of speed that is greater than a human could manually execute. Typically, velocity data attacks occur at a high velocity in short bursts of time. Detecting velocity data attacks in a network poses several technical challenges. Detecting high-speed attack in short bursts is challenging because of the high rate of speeds that the attacks occur and the randomness of transaction data and rate of when attacks can occur. In one application, this is important to protect valid financial transactions arriving for authorization at the same time as the fraud velocity attack. This technical challenge is compounded in a network environment because networks typically support a large amount of data traffic from numerous devices. Typically, closely monitoring data traffic for every device in the network in real-time consumes a lot processing resources in order to handle both the volume of the data and the resolution of monitoring that is necessary for detecting a high-speed data attack. As a result, conventional systems use post-processing data forensics to determine whether an attack has occurred. These post-processing techniques are unable to detect velocity data attacks in real-time, and therefore are unable to prevent the system from becoming overloaded.

The data attack detection system described in the present application provides an unconventional technical solution that allows real-time analysis of events to detect and stop velocity data attack immediately without relying on post-processing data forensics. The data attack detection system provides a technical solution that uses a two-stage approach that allows early velocity data attack detection. The data attack detection system improves the operation of the system by enabling the system to detect high-speed attacks (e.g. velocity data attacks) in real-time and mitigating attacks before the system becomes overloaded. By mitigating attacks, the data attack detection system also helps prevent performance degradation of downstream systems.

In one embodiment, the data attack detection system monitors and processes card activity for a large number of cards. Examples of cards include, but are not limited to, credit cards, debit cards, gift card, reward cards, and prepaid cards. The data attack detection system uses a two-stage approach to detect when a velocity data attack has occurred for a card. The first stage allows a large number of cards to monitored simultaneously in real-time without overburdening the system by monitoring every single transaction request for every card. In one embodiment, cards with a large volume of transaction requests within a short amount of time are monitored more closely in the second stage.

In the first stage, the data attack detection system monitors the number of transactions or transaction requests that are made on a particular card. When the number of transactions or transaction requests for the card exceeds a first activity level threshold value of transactions (e.g. 20 transactions) within a first time interval (e.g. one minutes), the data attack detection system proceeds to the second stage for closer monitoring of the card and its activity.

In the second stage, data attack detection system continues to monitor the number of transactions or transaction requests that are made on the card. When the number of transactions or transaction requests exceeds a second activity level threshold value of transactions (e.g. 100 transactions) within a second time interval (e.g. one second), the data attack detection system determines that a velocity data attack has occurred and triggers velocity event protection for the card to deny further transaction requests to protect the system from becoming overloaded and to programmatically notify downstream systems of the velocity event.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
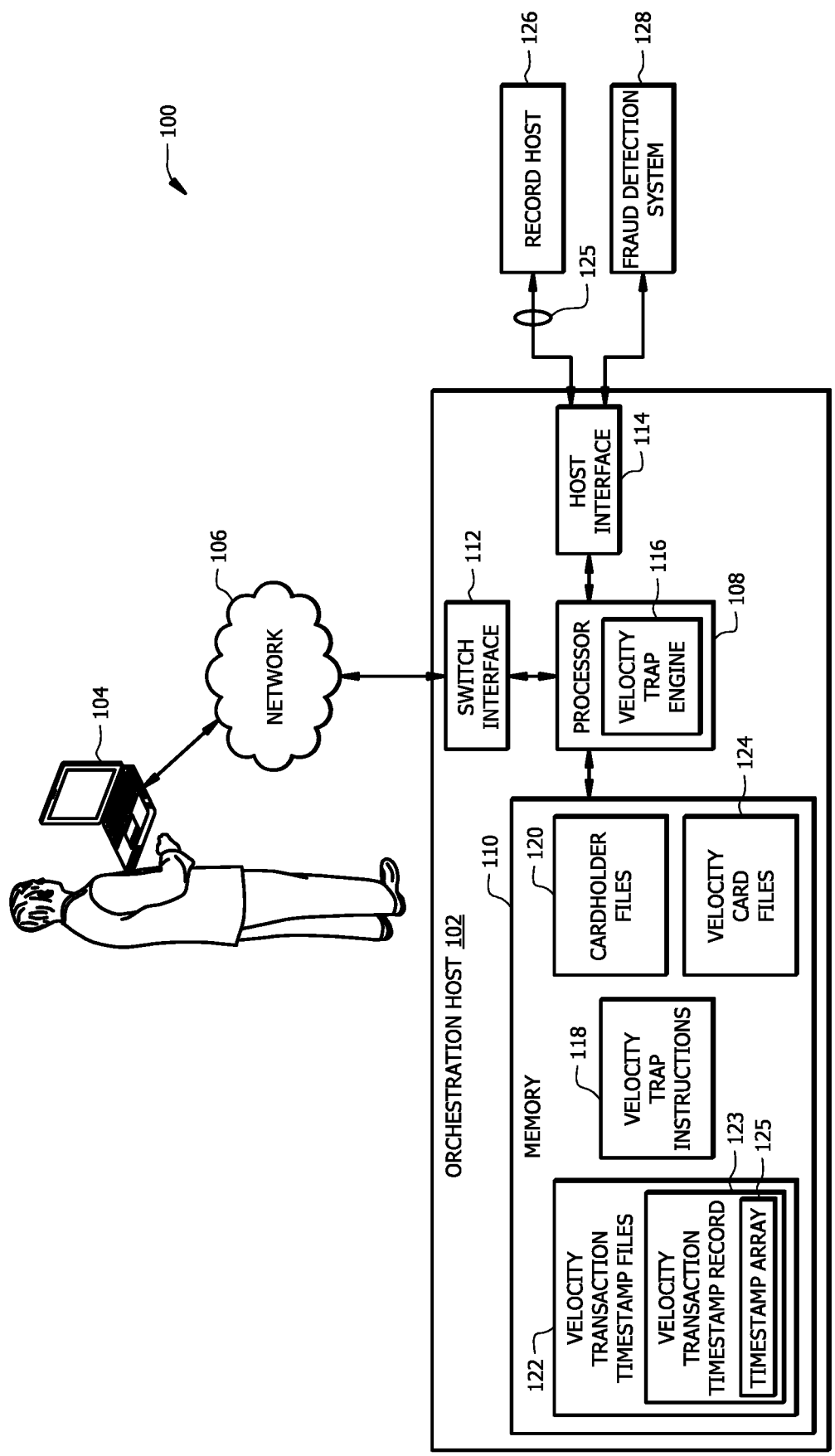
FIG. 1 is a schematic diagram of an embodiment of a data attack detection system.

FIG. 1 is a schematic diagram of an embodiment of a data attack detection system 100. The data attack system 100 comprises an orchestration host 102 in signal communication with a plurality of user devices 104 via a network 106. The orchestration host 102 is configured to employ any suitable type of connection to communicate data with the plurality of user devices 104. Examples of user devices 104 include, but are not limited to, mobile phones, computers, tablet computers, laptop computers, and automated teller machines (ATMs). The user devices 104 are configured to send transaction information and/or requests to the orchestration host 102.

The network 106 comprises a plurality of network nodes configured to communicate data between the orchestration host 102 and the one or more user device 104. Examples of network nodes include, but are not limited to, routers, switches, modems, web clients, and web servers. Network 106 is any suitable type of wireless and/or wired network including, but not limited to, all or a portion of the Internet, the public switched telephone network, a cellular network, a card network, and a satellite network. The network 106 is configured to support any suitable communication protocols as would be appreciated by one of ordinary skill in the art upon viewing this disclosure.

In one embodiment, the orchestration host 102 is a server comprising a processor 108, a memory 110, a switch interface 112, and a host interface 114. The orchestration host 102 may be configured as shown or in any other suitable configuration. The processor 108 comprises one or more processors operably coupled to the memory 110. The one or more processors are implemented as one or more central processing unit (CPU) chips, logic units, cores (e.g. a multi-core processor), field-programmable gate array (FPGAs), application specific integrated circuits (ASICs), or digital signal processors (DSPs). The one or more processors are communicatively coupled to and in signal communication with the memory 110. The one or more processors are configured to process data and may be implemented in hardware or software.

The one or more processors are configured to implement various instructions. For example, the one or more processors are configured to execute instructions to implement a velocity trap engine 116. In an embodiment, the velocity trap engine 116 is implemented using logic units, FPGAs, ASICs, DSPs, or any other suitable hardware. The velocity trap engine 116 is generally configured to detect velocity data attacks and to mitigate the effects of detected attacks. An example of the velocity trap engine 116 in operation is described in FIG. 2.

The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise read-only memory (ROM), random-access memory (RAM), ternary content-addressable memory (TCAM), dynamic random-access memory (DRAM), and static random-access memory (SRAM). The memory 110 is operable to store velocity trap instructions 118, cardholder files 120, velocity transaction timestamp files 122, velocity card files 124, and/or any other data or instructions. The velocity trap instructions 118 comprise any suitable set of instructions, logic, rules, or code operable to execute the velocity trap engine 116.

A cardholder file 120 is operable to store card activity, for example, a log of transaction information for a card. A cardholder file 120 may comprise transaction information for a card over some period of time, for example, a day, week, a month, or a year. The transaction information may comprise card information (e.g. card status), account information for the cardholder, vendor information, transaction information, timestamps, and/or any other information about transactions for a card.

A velocity transaction timestamp file 122 is operable to store transaction information for a plurality of cards and timestamp information linked with the transaction information. The velocity transaction timestamp file 122 is used for storing information for monitoring and detecting velocity data attacks. The velocity transaction timestamp file 122 comprise a plurality of velocity transaction timestamp records 123. Each velocity transaction timestamp record 123 is linked with a particular card and comprises information for the card. For example, a velocity transaction timestamp record 123 may comprise a card number, a card identifier (e.g. a financial institution identifier (FIID)), transaction information for the card, and/or any other information for the card. Each velocity transaction timestamp record 123 may comprise or may be linked with a timestamp array 125 that stores transaction information for the card. The timestamp array 125 is generally configured to store recent transaction information and transaction timestamps for a card. Each velocity transaction timestamp record 123 further comprises information identifying an entry index value that corresponds with their timestamp array 125. The entry index value identifies the location of the most recent entry in the timestamp array 125. Additional information about timestamp array 125 is described in FIG. 3. Examples of using velocity transaction timestamp record 123 and timestamp array 125 are described in FIGS. 2 and 4.

A velocity card file 124 is operable to store information related to a card when a velocity data attack has been detected for the card. For example, a velocity card file 124 is generated and/or populated in response to determining that a card has experienced a velocity data attack. The velocity card file 124 comprises information including, but not limited to, card information, account information for the cardholder, transaction information, location information about where the velocity data attack occurred, network address information, device information about the device used to perform the velocity data attack, and/or any other type of information. In one embodiment, velocity card files 124 may be used for post-processing data forensic analysis.

The switch interface 112 is a network interface operably coupled to the processor 108 and the network 106. The switch interface 112 is configured to receive data (e.g. transaction information or requests) from the network 106 and to route the received data to the velocity trap engine 116. In one embodiment, the switch interface 112 is configured to format data received from the network 106 for analysis and processing by the velocity trap engine 116. For example, the switch interface 112 is configured to convert data received from the network 106 from a first format to second format for processing by the velocity trap engine 116. In one embodiment, the switch interface 112 is configured to receive authorization responses from the velocity trap engine 116 and to send the authorization responses to the network 106. An authorization response may be an approval or denial for a card transaction request.

In one embodiment, the switch interface 112 comprises a data structure (e.g. a table) configured to track the current status of cards. For example, the switch interface 112 may be configured to receive notifications from the velocity trap engine 116 when trigger velocity event protection has been triggered for a card. In this example, the switch interface 112 adds information (e.g. an identifier) for the card to its data structure to indicate that the trigger velocity event protection is active for this card. When the switch interface 112 receives a transaction request, the switch interface 112 determines whether the card associated with the transaction request has trigger velocity event protection activated. If the switch interface 112 determines that the card currently has trigger velocity event protection activated, the switch interface 112 will automatically decline the transaction to prevent any further processing by the system. This process allows the switch interface 112 to act as a front door check for the system to automatically decline cards that have previously experienced trigger velocity event attacks.

The host interface 114 is a network interface operably coupled to the processor 108 and one or more other devices (e.g. external devices). The host interface 114 is configured to receive data from the velocity trap engine 116 and to send data to one or more other devices or systems. For example, the host interface 114 may be configured to send messages from the velocity trap engine 116 to one or more other devices and to send the responses from the one or more devices to the velocity trap engine 116. In one embodiment, the host interface 114 is configured to format data received from the velocity trap engine 116 from a first format to a second format for the one or more other devices or systems.

In one embodiment, the data attack detection system 100 comprises a record host 126 and a fraud detection system 128. In other embodiments, the data attack detection system 100 comprises any other external devices or combinations of external devices. The orchestration host 100 is in signal communication with the record host 126 and the fraud detection system 128 using the host interface 114. The host interface 114 is configured to pre-process transaction data and to facilitate or maintain transaction flows 125 between the orchestration host 102 and other devices (e.g. the record host 126). A transaction flow 125 is a series of message exchanges for information about a particular card between the network 106 and the one or more external devices. For example, a transaction flow 125 may comprises a series of requests and responses for information about a card status or account balances that are communicated between the network 106 and the record host 126 via the orchestration host 102.

The record host 126 comprises records and/or account information for a plurality of cards and cardholders. For example, the record host 126 comprises account information, card or account statuses, and/or account balances for a plurality of cards and cardholders. The record host 126 may be configured to receive information requests from the orchestration host 102 about a card or cardholder and to send the requested information to the orchestration host 102. For example, the orchestration host 102 may send an information request to validate account status and account balances and the record host 126 sends responses with the requested information.

The fraud detection system 128 is configured to monitor and detect for malicious or fraudulent activity and to dispatch a notification event to the customer that their card has had suspicious activity. For example, the fraud detection system 128 may be configured to perform post-processing or forensic analysis on the account information for a card or cardholder to detect fraud. In other examples, the fraud detection system 128 may employ any other suitable technique for detecting fraud as would be appreciated by one of ordinary skill in the art.

Figure 2:
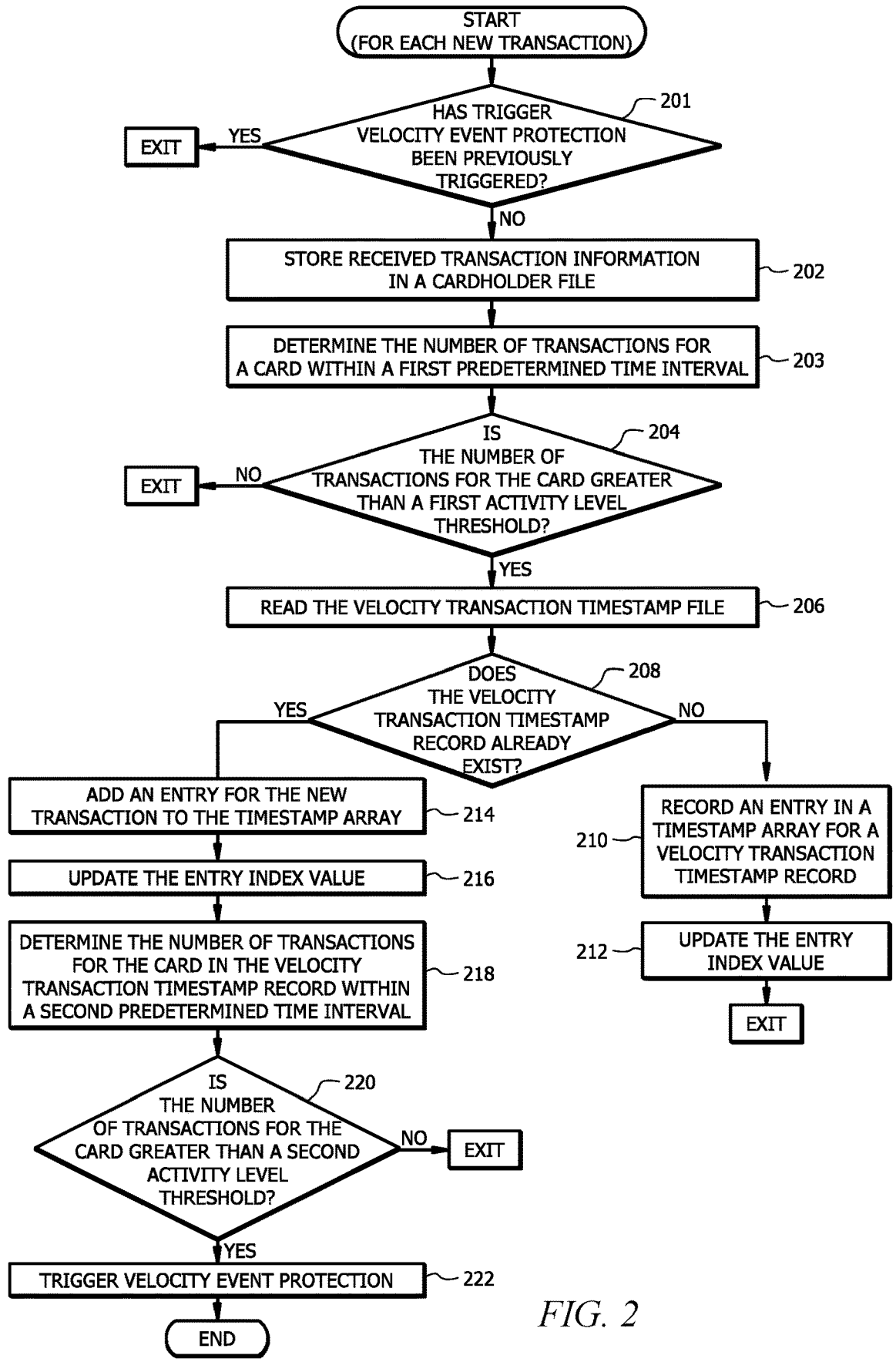
FIG. 2 is a flowchart of an embodiment of a data attack detection method for the data attack detection system.

FIG. 2 is a flowchart of an embodiment of a data attack detection method 200 for the data attack detection system 100. Method 200 is implemented by the velocity trap engine 116 for each new transaction to detect velocity data attacks on a card and to trigger velocity event protection for the card in response to detecting a velocity data attack. A non-limiting example is provided to illustrate how the velocity trap engine 116 implements method 200 to detect and mitigate velocity data attacks.

In this example, a malicious person attempts or makes several purchase transactions using a particular card. When the malicious person attempts to make a transaction they may try to use different combinations of PIN numbers, card verification values (CVVs), zip codes, and/or any other suitable kind of credentials to perform an attack on the card or an account linked with the card. For example, they may run a script that automatically tries hundreds of CVV numbers with the card in a short amount of time to attempt to make a transaction with the card. Each attempt generates a new transaction or transaction request.

When a new transaction request is received for a card, the velocity trap engine 116 executes method 200. At step 201, the velocity trap engine 116 checks whether trigger velocity event protection was been previously triggered for the card. For example, the velocity trap engine 116 may read the card holder file 120 to determine the status of the card and whether a trigger velocity event has previously been detected on the card. When the velocity trap engine 116 determines that trigger velocity event protection was been previously triggered for the card, the velocity trap engine 116 exits the routine and declines the transaction. In other words, the transaction may be automatically decline without any further processing by the velocity trap engine 116 and the system. When the velocity trap engine 116 determines that trigger velocity event protection has not previously been triggered for the card, the velocity trap engine 116 proceeds to step 202.

At step 202, the velocity trap engine 116 stores received transaction information for the card in a cardholder file 120 associated with the card. The velocity trap engine 116 stores the transaction information for the card in cardholder file 120 to increment a counter based on transaction activity that has been made or attempted with the card. The transaction information is received by the switch interface 112 from the network 106 and forwarded to the velocity trap engine 116. The transaction information may comprise information about completed transactions and/or transaction requests.

The velocity trap engine 116 begins in the first stage to monitor the number of transaction requests and transactions that are made on the card. The velocity trap engine 116 periodically checks whether to transition to the second stage for closer monitoring of the card based on the number of transactions requested or made with the card. For example, the velocity trap engine 116 checks whether to transition to the second stage based on the card activity within the configured time (e.g. every five minutes), when new transaction information is received for the card, or based on any other suitable criteria.

At step 203, the velocity trap engine 116 determines the number of transactions for the card within a first predetermined time interval. The velocity trap engine 116 counts the number of transaction entries (e.g. transactions and/or transaction requests) that occur within the first predetermined time interval (e.g. two minutes) in the cardholder file 120 associated with the card. As an example, the velocity trap engine 116 counts the number of transaction entries that occur within a two minute window. In other words, the velocity trap engine 116 determines how many transaction entries have been made on the card within the last two minutes of the most recent transaction or transaction request. In other examples, the velocity trap engine 116 determines the number of transactions that have been made or attempted on the card within any other suitable predetermined time interval.

The velocity trap engine 116 is configured with a first activity level threshold (e.g. 25 transactions) that is used to trigger the velocity trap engine 116 to transition to the second stage for closer monitoring of the activity for the particular card. When the number of transactions for the card exceeds the first activity level threshold (e.g. 25 transactions) within the first predetermined time interval (e.g. two minutes), the card is then monitored more closely for possible velocity data attacks. The velocity trap engine 116 may use any suitable predetermined time intervals, first activity level threshold values, and/or combinations thereof. By using the first activity level threshold and first predetermined time interval, the velocity trap engine 116 is able to efficiently allocate resources such that all of the activity in the network can be monitored coarsely in the first stage and only some cards are monitored more closely in the second stage.

At step 204, the velocity trap engine 116 proceeds to step 206 when the velocity trap engine 116 determines that the number of transactions for the card within the first predetermined time interval is greater than the first activity level threshold. Otherwise, the velocity trap engine 116 exits the routine and continues processing the transaction.

As an example, the velocity trap engine 116 determines that 30 transactions or transaction requests have been recorded in the cardholder file 120 for the card within the last two minutes. In this example, the velocity trap engine 116 determines that within the first time interval (e.g. two minutes) the number of transactions for the card is 30, which is greater that the first activity level threshold of 25 transactions. In response to determining that the number of transactions for the card within the first predetermined time interval is greater than the first activity level threshold, the velocity trap engine 116 transitions to the second stage for closer monitoring of the card.

In the second stage, the velocity trap engine 116 uses a velocity transaction timestamp file 122 to monitor the activity of the card that may be experiencing a velocity data attack. When another transaction has occurs after the velocity trap engine 116 has determined that the number of transactions for the card is greater than the first activity level, the velocity trap engine 116 reenters method 200 at step 206 to enter the second stage for monitoring the activity of the card. At step 206, the velocity trap engine 116 reads the velocity transaction timestamp file 122 to identify a velocity transaction timestamp record 123 for the card.

At step 208, the velocity trap engine 116 determines whether velocity transaction timestamp record 123 already exists in the velocity transaction timestamp file 122 for the card. For example, the velocity trap engine 116 may use an account number as a record key to search the velocity transaction timestamp file 122. The velocity trap engine 116 proceeds to step 210 when the record does not already exist. Otherwise, the velocity trap engine 116 proceeds to step 214.

Figure 3:
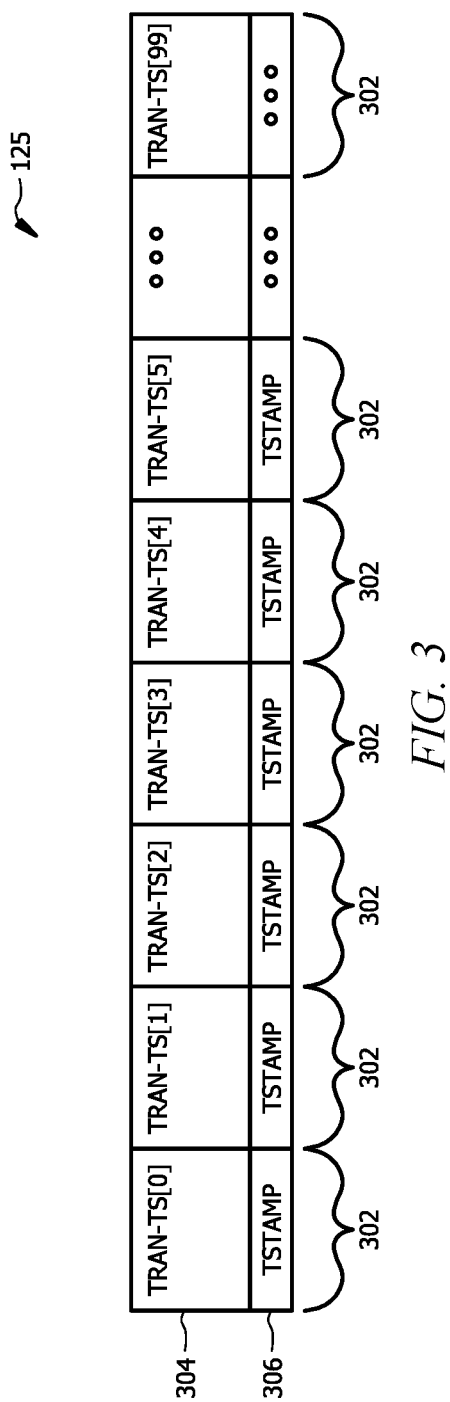
FIG. 3 is an embodiment of a timestamp array linked with a velocity transaction timestamp record in a velocity transaction timestamp file.

The velocity trap engine 116 generates a new velocity transaction timestamp record 123 and timestamp array 125 for the card when the velocity transaction timestamp record 123 does not already exist. An example of a timestamp array 125 linked with a velocity transaction timestamp record 123 in a velocity transaction timestamp file 122 is described in FIG. 3. Referring to FIG. 3, the timestamp array 125 comprises a plurality of entries 302 for a card. The timestamp array 125 may comprise any number of entries 302. For example, the timestamp array 125 may be an array with 100 entry slots. In other examples, the timestamp array 125 may be any other suitable data structure. In one embodiment, the timestamp array 125 is configured as a circular buffer or in a first-in-first-out (FIFO) configuration. In one embodiment, new entries 302 are appended to the last entry 302 that was entered into the timestamp array 125. When the timestamp array 125 runs out of available slots for entries 302, the oldest entry 302 (e.g. the first entry 302) will be overwritten or deleted to allow a new entry 302 to be created. In another embodiment, the timestamp array 125 is configured such that new entries 302 are added to the first position in the timestamp array 125 and other existing entries 302 are shifted to the next position in the timestamp array 125. In other embodiments, the timestamp array 125 may use any other suitable type of configuration. When a new entry 302 is created, a last entry index value is updated to indicate the location of the most recent entry 302 in the timestamp array 125.

Each entry 302 comprises a transaction identifier field 304 and a timestamp field 306. The transaction identifier field 304 comprises information related to a transaction for a card. For example, the transaction identifier field 304 may comprise a device number, a transaction identifier, a transaction amount, vendor information, a device identifier, and/or any other information about a transaction for the card. The timestamp field 306 comprises timing information associated with a transaction in a transaction identifier field 304. For example, the timestamp field 306 comprises a timestamp indicating the time a transaction occurred. The timestamp may be represented using a date, time, a Julian date or time, or any other suitable timing metric. For example, the timestamp may be in units of seconds or microseconds. The timestamp may be represented using an absolute time or a relative time.

At step 210, the velocity trap engine 116 records an entry in a timestamp array 125 for a new velocity transaction timestamp record 123 in the velocity transaction timestamp file 122 for the card. The velocity trap engine 116 creates an entry in the timestamp array 125 that comprises transaction information and a timestamp associated with the transaction information. For example, the new entry comprises a transaction identifier and a timestamp indicating when the transaction occurred.

At step 212, the velocity trap engine 116 updates the entry index value for the timestamp array 125 in the velocity transaction timestamp record 123. The entry index value is updated to indicate the location of the most recent entry in the timestamp array 125. For example, if the entry is in the first entry slot, then the entry index value will reflect that the location of the first entry (i.e. the first entry slot). Updating the entry index value allows the velocity trap engine 116 to track the most recent entries in the timestamp array 125 and the velocity transaction timestamp record 123. In one embodiment, the velocity trap engine 116 exits the routine to continue processing the transaction once the velocity transaction timestamp file 123 has been generated in the velocity transaction timestamp file 122. The velocity trap engine 116 will continue to monitor and check for activity related to the card. Returning to step 208, when a new transaction occurs and the velocity trap engine 116 determines that a velocity transaction timestamp record 123 already exists, the velocity trap engine 116 proceeds to step 214. At step 214, the velocity trap engine 116 adds an entry for the new transaction to the timestamp array 125 of the velocity transaction timestamp record 123 for the card. The velocity trap engine 116 creates the new entry in the timestamp array 125 similarly to as described in step 210. At step 216, the velocity trap engine 116 updates the entry index value for the velocity transaction timestamp record 123. The velocity trap engine 116 updates the entry index value for the velocity transaction timestamp record 123 similarly to as described in step 212.

In one embodiment, the velocity trap engine 116 may shift existing entries and timestamps in the timestamp array 125 using a FIFO methodology. For example, the velocity trap engine 116 places the oldest timestamp into the next available array position and records the index value of that array position. The velocity trap engine 116 then places the next oldest timestamp into the position previously occupied by the oldest timestamp. This process may be repeated for the remaining entries in the array. The current timestamp may be then be added into the first array position. The corresponding index values are also updated to reflect the new position of the timestamps.

The velocity trap engine 116 checks whether a velocity data attack has been detected for the card. At step 218, the velocity trap engine 116 determines the number of transactions for the card in the velocity transaction timestamp record 123 within a second predetermined time interval (e.g. 30 seconds). The velocity trap engine 116 counts the number of transaction entries that occur within the second predetermined time interval in the velocity transaction timestamp record 123. As an example, the velocity trap engine 116 counts the number of transactions that have been made within the thirty seconds of the most recent transaction or transaction request. In other examples, the velocity trap engine 116 determines the number of transactions that have been made or attempted on the card within any other suitable predetermined time interval.

At step 220, the velocity trap engine 116 determines whether the number of transactions for the card in the velocity transaction timestamp record 123 within the second predetermined time interval (e.g. 30 seconds) is greater than a second activity level threshold (e.g. 100 transactions). The velocity trap engine 116 uses second activity level threshold to trigger velocity event protection for the card. When the number of transactions for the card in the velocity transaction timestamp record 123 exceeds the second activity level threshold within the second predetermined time interval, the velocity trap engine 116 proceeds to step 222 to trigger velocity event protection for the card.

The velocity trap engine 116 uses the second activity level threshold and the second predetermined interval in the second stage to allow real-time detection of velocity data attacks. The velocity trap engine 116 also uses the second stage to trigger velocity event protection to mitigate the effects of the attack before the system becomes overloaded. Triggering velocity event protection indicates that a velocity data attack has occurred and allows the system to take actions to address the attack. For example, triggering velocity event protection discontinues transaction flows for the card to protect the system from becoming overloaded. More details about triggering velocity event protection are described in step 222. The velocity trap engine 116 may use any suitable combination of predetermined time intervals and second activity level threshold values.

Figure 4:
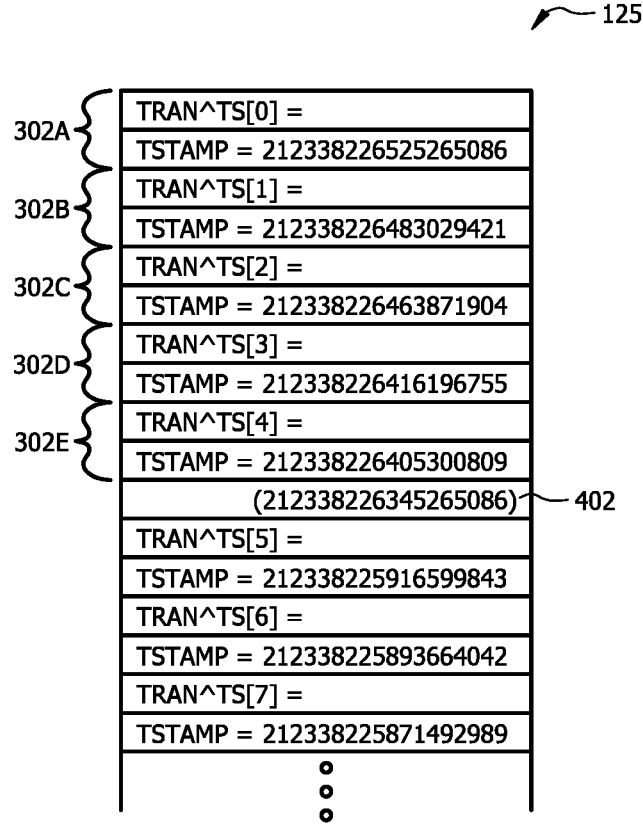
FIG. 4 is an embodiment of a velocity transaction timestamp record in operation.

An example of a velocity transaction timestamp record 123 being used to determine whether or not to trigger velocity event protection for the card is described in FIG. 4. Referring to FIG. 4, a portion of a timestamp array 125 for a velocity transaction timestamp record 123 is shown. The velocity trap engine 116 first determines the number of transaction entries that have occurred within the second predetermined time interval. In one embodiment, the timestamps are Julian timestamps in units of microseconds. The second activity level threshold is set to four transactions and the second predetermined time interval is set to three minutes. The velocity trap engine 116 determines the current time 402 and the most recent entry in the timestamp array 125 using the entry index value. The velocity trap engine 116 then counts the number of entries that are within three minutes of the current time 402. In this example, the velocity trap engine 116 subtracts three minutes from the current time 402 to determine the time interval for counting entries. In other examples, the velocity trap engine 116 may employ any other suitable technique for determining the number of entries within the second time interval.

The velocity trap engine 116 identifies entries 302A, 302B, 302C, 302D, and 302E as occurring within the second time interval of the current time 402. The velocity trap engine 116 then compares the number of identified entries that occurred within the second time interval to the second activity level threshold. The total number of identified entries is five, which is greater than the second activity level threshold of four transactions. Thus, in this example, the velocity trap engine 116 concludes that the number of identified entries that occurred within the second time interval is greater than the second activity level threshold. In other examples, the velocity trap engine 116 may detect velocity data attack when 100 transactions occurs within one second, when 10 transactions occur within one second, or based on any other suitable combination of second activity level threshold and predetermined time interval.

Referring back to FIG. 2, the velocity trap engine 116 proceeds to step 222 when the number of transactions for the card in the velocity transaction timestamp record 123 within the second predetermined time interval is greater than the second activity level threshold. Otherwise, the velocity trap engine 116 exits the routine to continue processing the transaction.

When the velocity trap engine 116 detects a velocity data attack has occurred based on the card activity of the card, the velocity trap engine 116 trigger velocity event protection for the card to disable the card and/or to protect the system. At step 222, the velocity trap engine 116 triggers velocity event protection for the card. When the velocity trap engine 116 triggers velocity event protection for the card, the velocity trap engine 116 discontinues a transaction flow between the orchestration host 102 and one or more devices (e.g. the record host 126) for the card. Discontinuing the transaction flow for the card prevents transaction information and requests for the card from being sent between the orchestration host 102 and other devices. Discontinuing the transaction flow for the card allows the orchestration host 102 to mitigate the effects of the velocity data attack in real-time before the system becomes overloaded, which also prevents performance degradation of downstream systems.

In one embodiment, discontinuing transaction flows for the card prohibits new transactions for the card but allows preexisting transactions (e.g. reoccurring transactions) to continue. A transaction type identifier may be used to indicate whether a transaction request is a new request or a preexisting request. In such an embodiment, transaction requests with a transaction type identifier indicating a new request are denied while transaction requests with a transaction type identifier indicating a preexisting request are allowed to continue. For example, when the velocity trap engine 116 triggers velocity event protection for the card reoccurring payments (e.g. reoccurring bill payments) using the card may still be allowed, while new transactions on the card are denied.

In one embodiment, when the velocity trap engine 116 triggers velocity event protection for the card, the velocity trap engine 116 changes a status for the card in the cardholder file 120 to indicate that a velocity data attack was detected for the card. Changing the card status to reflect that a velocity data attack was detected for the card allows the velocity trap engine 116 to quickly determine the status of the card in the event that additional transaction requests are received for the card. For example, the velocity trap engine 116 may immediately deny any transaction requests for the card when the status indicates that a velocity data attack has occurred on the card.

In one embodiment, triggering velocity event protection comprises generating an entry in a velocity card file 124 for the card. The entry in the velocity card file 124 may comprise transaction information about transactions for the card within the second predetermined time interval and/or any other information about the card or transaction information associated with the card.

In one embodiment, when the velocity trap engine 116 triggers velocity event protection for the card, the velocity trap engine 116 send notifications to the network 106 and/or other devices (e.g. the switch interface 112, the record host 126, and/or the fraud detection system 128) indicating that a velocity data attack was detected for the card. The notifications inform the other devices about the status of the card. For example, the velocity trap engine 116 sends a notification to the fraud detection system 128, which triggers the fraud detection system 128 to notify the cardholder and/or financial institution associated with the card about the velocity data attack. As another example, the velocity trap engine 116 sends a notification to the switch interface 112 which causes the switch interface 112 to deny further transaction requests for the card. Examples of notifications include, but are not limited to, emails and a graphical user interface prompt or alert.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A data attack detection system comprising:
a record host configured to store account information for a plurality of card holders; and
an orchestration host in signal communication with the record host, and comprising:
a memory operable to store:
a cardholder file comprising card activity information and a card status associated with a card; and
velocity transaction timestamp records, wherein each velocity transaction timestamp record comprises transaction information for the card and timestamp information linked with the transaction information;
a switch interface configured to:
receive a plurality of transaction requests from a network;
determine the card status for the card associated with at least one of the plurality of transaction requests based on the cardholder file;
determine the card status does not indicate that velocity event protection is active for the card; and
forward the at least one of the plurality of transaction requests to a velocity trap engine in response to determining that the card status does not indicate that velocity event protection is active for the card; and
the velocity trap engine implemented by a processor operably coupled to the memory, and configured to:
receive the at least one of the transaction requests comprising transaction information for the card;
store received transaction information for the card in the cardholder file;
determine a number of transactions for the card within a first predetermined time interval based on the card activity information;
determine whether the number of transactions for the card within the first predetermined time interval exceeds a first activity level threshold;
create a first entry in a velocity transaction timestamp record for the card in response to determining the number of transactions for the card within the first predetermined time interval exceeds the first activity level threshold, wherein the first entry for the card in the velocity transaction timestamp record comprises at least a portion of the received transaction information and a timestamp associated with the transaction information;
detect a new transaction has been reported for the card;
create a second entry in the velocity transaction timestamp record for the card in response to detecting a new transaction has been reported for the card;
determine a number of transactions for the card within a second predetermined time interval based on the velocity transaction timestamp record for the card;
determine whether the number of transactions for the card within the second predetermined time interval exceeds a second activity level threshold; and trigger velocity event protection for the card in response to determining the number of transactions for the card within the second predetermined time interval exceeds the second activity level threshold, wherein:
triggering the velocity event protection for the card comprises updating the card status in the cardholder file to indicate that the velocity event protection is active for the card; and
updating the card status in the cardholder file to indicate that the velocity event protection is active for the card triggers the switch interface to reject subsequent transaction requests for the card before forwarding the subsequent transaction requests to the velocity trap engine.

2. The system of claim 1, wherein:
the velocity transaction timestamp record comprises a timestamp array comprising a plurality of entries; and
the timestamp array is configured to store data using a first-in-first-out methodology.

3. The system of claim 1, wherein the orchestration host further comprises a host interface configured to facilitate a transaction flow for the card between the orchestration host and the record host.

4. The system of claim 1, wherein:
triggering the velocity event protection for the card generates an entry for the card in a velocity card file stored in the memory; and
the entry for the card in the velocity card file comprises second transaction information about the transactions for the card within the second predetermined time interval.

5. The system of claim 1, wherein creating a respective entry in the velocity transaction timestamp record for the card comprises updating an entry index value identifying the location of the most recent entry in a timestamp array.

6. A data attack detection method comprising:
receiving, by a switch interface, a plurality of transaction requests comprising transaction information for a card from a network;
determining, by the switch interface, a card status for the card associated with at least one of the plurality of transaction requests based on a cardholder file, wherein the cardholder file comprises card activity information and the card status associated with the card;
determining, by the switch interface, the card status does not indicate that velocity event protection is active for the card;
forwarding, by the switch interface, the at least one of the transaction requests to a velocity trap engine in response to determining that the card status does not indicate that velocity event protection is active for the card;
storing, by the velocity trap engine, received transaction information for the card in the cardholder file;
determining, by the velocity trap engine, a number of transactions for the card within a first predetermined time interval based on card activity information in the cardholder file;
determining, by the velocity trap engine, whether the number of transactions for the card within the first predetermined time interval exceeds a first activity level threshold;
creating, by the velocity trap engine, a first entry in a velocity transaction timestamp record for the card in response to determining the number of transactions for the card within the first predetermined time interval exceeds the first activity level threshold, wherein the first entry for the card in the velocity transaction timestamp record comprises at least a portion of the transaction information and a timestamp associated with the transaction information;
detecting, by the velocity trap engine, a new transaction has been reported for the card;
creating, by the velocity trap engine, a second entry in the velocity transaction timestamp record for the card in response to detecting a new transaction has been reported for the card;
determining, by the velocity trap engine, a number of transactions for the card within a second predetermined time interval based on the velocity transaction timestamp record for the card;
determining, by the velocity trap engine, whether the number of transactions for the card within the second predetermined time interval exceeds a second activity level threshold; and
triggering, by the velocity trap engine, velocity event protection for the card in response to determining the number of transactions for the card within the second predetermined time interval exceeds the second activity level threshold, wherein:
triggering the velocity event protection for the card comprises updating the card status in the cardholder file to indicate that the velocity event protection is active for the card; and
updating the card status in the cardholder file to indicate that the velocity event protection is active for the card triggers the switch interface to reject subsequent transaction requests for the card before forwarding the subsequent transaction requests to the velocity trap engine.

7. The method of claim 6, wherein detecting the new transaction has been reported for the card is in response to receiving, by the switch interface, transaction information for the card from a network.

8. The method of claim 6, further comprising discontinuing a transaction flow by a host interface configured to facilitate a transaction flow for the card to one or more external devices in response to triggering the velocity event protection.

9. The method of claim 6, wherein: triggering the velocity event protection for the card generates an entry for the card in a velocity card file stored in a memory; and the entry for the card in the velocity card file comprises second transaction information about the transactions for the card within the second predetermined time interval.

10. The method of claim 6, wherein creating a respective entry in the velocity transaction timestamp record for the card comprises updating an entry index value identifying the location of the most recent entry in a timestamp array.

11. The method of claim 6, wherein triggering the velocity event protection for the card changes a status for the card in the cardholder file.

12. A data attack detection device, comprising:
a memory operable to store:
a cardholder file comprising card activity information and a card status associated with a card; and
velocity transaction timestamp records, wherein each velocity transaction timestamp record comprises transaction information for the card and timestamp information linked with the transaction information;
a switch interface configured to:
receive a new transaction;

determine a card status for the card associated with the new transaction; and forward the new transaction to a velocity trap engine in response to determining that the card status does not indicate that velocity event protection is active for the card; and the velocity trap engine implemented by a processor operably coupled to the memory and the switch interface, and configured to:

detect the new transaction has been reported for the card;

create a first entry in a velocity transaction timestamp record for the card in response to detecting the new transaction has been reported for the card;

determine a number of transactions for the card within a first predetermined time interval based on the velocity transaction timestamp record for the card;

determine whether the number of transactions for the card within the first predetermined time interval exceeds a first activity level threshold;

determine a number of transactions for the card within a second predetermined time interval based on the card activity information;

determine whether the number of transactions for the card within the second predetermined time interval exceeds a second activity level threshold; and trigger velocity event protection for the card in response to determining the number of transactions for the card within the second predetermined time interval exceeds the second activity level threshold, wherein:

triggering the velocity event protection for the card comprises updating the card status in the cardholder file to indicate that the velocity event protection is active for the card; and updating the card status in the cardholder file to indicate that the velocity event protection is active for the card triggers the switch interface to reject subsequent transaction requests for the card before forwarding the subsequent transaction requests to the velocity trap engine.

13. The device of claim 12, further comprising:

create a second entry in the velocity transaction timestamp record for the card in response to determining the number of transactions for the card within the second predetermined time interval exceeds the second activity level threshold, wherein the second entry for the card in the velocity transaction timestamp record comprises second transaction information and a timestamp associated with the transaction information.

14. The device of claim 12, further comprising a host interface configured to facilitate a transaction flow for the card to one or more external devices.

15. The device of claim 12, wherein:

triggering the velocity event protection for the card generates an entry for the card in a velocity card file stored in the memory; and the entry for the card in the velocity card file comprises second transaction information about the transactions for the card within the second predetermined time interval.

16. The device of claim 12, wherein creating a respective entry in the velocity transaction timestamp record for the card comprises updating an entry index value identifying the location of the most recent entry in a timestamp array.

17. The device of claim 12, wherein discontinuing a transaction flow for the card prohibits new transactions for the card and allows preexisting transactions for the card.

* * * * *